(12) United States Patent
Berger et al.

(10) Patent No.: US 7,876,978 B2
(45) Date of Patent: Jan. 25, 2011

(54) REGIONS OF INTEREST IN VIDEO FRAMES (75) Inventors: Adam L Berger, Pittsburgh, PA (US);
Gregory C. Schohn, Brooklyn, NY (US); Michael J. Wener, Munsing, MI (US)

(73) Assignee: Penthera Technologies, Inc., Pittsburgh, PA (US)

( * ) Notice: Subject to any disclaimer, the term of this patent is extended or adjusted under 35 U.S.C. 154(b) by 494 days.

(21) Appl. No.: 11/249,897

(22) Filed: Oct. 13, 2005

(65) Prior Publication Data
US 2007/0086669 A1  Apr. 19, 2007

(51) Int. Cl.
*G06K 9/32* (2006.01)
*H04N 5/14* (2006.01)

(52) U.S. Cl. .................. 382/299; 382/298; 348/25
(58) Field of Classification Search .......... 382/298, 382/299; 348/25
See application file for complete search history.

(56) References Cited

U.S. PATENT DOCUMENTS

| | | | | | |
|---|---|---|---|---|---|
| 4,513,317 | A | * | 4/1985 | Ruoff, Jr. | 375/240.25 |
| 4,829,370 | A | * | 5/1989 | Mayne et al. | 358/537 |
| 5,361,309 | A | * | 11/1994 | Sugiyama | 382/177 |
| 5,471,247 | A | * | 11/1995 | Hartnack | 375/240.12 |
| 5,699,458 | A | * | 12/1997 | Sprague | 382/250 |
| 5,852,435 | A | * | 12/1998 | Vigneaux et al. | 345/428 |
| 6,078,349 | A | * | 6/2000 | Molloy | 348/14.07 |
| 6,424,385 | B1 | * | 7/2002 | Koyama et al. | 348/734 |
| 6,476,873 | B1 | * | 11/2002 | Maeng | 348/561 |
| 6,757,008 | B1 | * | 6/2004 | Smith | 348/143 |
| 6,959,450 | B1 | * | 10/2005 | Ritter et al. | 725/133 |
| 7,061,980 | B2 | * | 6/2006 | Hori et al. | 375/240.08 |
| 7,075,567 | B2 | * | 7/2006 | Hunter et al. | 348/208.13 |
| 7,324,689 | B1 | * | 1/2008 | Vide | 382/167 |
| 2002/0101612 | A1 | * | 8/2002 | Lauper et al. | 358/1.15 |
| 2002/0126755 | A1 | * | 9/2002 | Li et al. | 375/240.12 |
| 2002/0170057 | A1 | * | 11/2002 | Barrett et al. | 725/41 |
| 2003/0026588 | A1 | * | 2/2003 | Elder et al. | 386/46 |

(Continued)

FOREIGN PATENT DOCUMENTS

GB  2396766  6/2004

OTHER PUBLICATIONS

Sato et al., "Video OCR for Digital News Archives", IEEE Worship on Content-Based Access of Image and Video Databases (CAIVD '98), Bombay, India, pp. 52-60, Jan., 1998.

(Continued)

*Primary Examiner*—Bhavesh M Mehta
*Assistant Examiner*—Gandhi Thirugnanam
(74) *Attorney, Agent, or Firm*—Fish & Richardson P.C.

(57) ABSTRACT

A first representation of a video stream is received that includes video frames, the representation expressing the video frames at a relatively high pixel resolution. At least one of the video frames is detected to include a region of interest. A second representation of the video stream that expresses the video frames at a relatively low pixel resolution is provided to a video playing device. Included with the second representation is additional information that represents at least a portion of the region of interest at a resolution level that is higher than the relatively low pixel resolution.

13 Claims, 8 Drawing Sheets
(6 of 8 Drawing Sheet(s) Filed in Color)

U.S. PATENT DOCUMENTS

| | | | | |
|---|---|---|---|---|
| 2003/0038897 | A1* | 2/2003 | Shiotsu | 348/725 |
| 2003/0095135 | A1* | 5/2003 | Kaasila et al. | 345/613 |
| 2003/0147640 | A1* | 8/2003 | Voss et al. | 396/310 |
| 2004/0120591 | A1* | 6/2004 | Brower et al. | 382/240 |
| 2004/0141067 | A1* | 7/2004 | Nakayama et al. | 348/222.1 |
| 2005/0123201 | A1* | 6/2005 | Nakashima et al. | 382/195 |
| 2006/0050785 | A1* | 3/2006 | Watanabe et al. | 375/240.03 |
| 2006/0139672 | A1* | 6/2006 | Goto | 358/1.13 |
| 2006/0239574 | A1* | 10/2006 | Brower et al. | 382/240 |
| 2007/0035665 | A1* | 2/2007 | Khare et al. | 348/586 |
| 2007/0229530 | A1* | 10/2007 | Marshall et al. | 345/587 |
| 2008/0043832 | A1* | 2/2008 | Barkley et al. | 375/240 |

OTHER PUBLICATIONS

Viola et al., "Robust Real-Time Object Detection", Second International Workshop on Statistical and Computational Theories of Vision—Modeling, Learning, Computing, and Sampling, Vancouver, Canada, Jul. 13, 2001.

Harville et al., "Foreground Segmentation Using Adaptive Mixture Models in Color and Depth", Proceedings of the IEEE Workshop on Detection and Recognition of Events in Video, (Vancouver, Canada), Jul. 2001.

Smith et al., "Video Skimming and Characterization through the Combination of Image and Language Understanding", IEEE International Workshop on Content-Based Access of Image and Video Databases (ICCV98—Bombay, India), 1998.

Darwin Streaming Server (from Apple): http://developer.apple.com/darwin/proiects/streaming. Printed Sep. 14, 2005.

Helix Producer Plus (from Real Networks): http://www.realnetworks.com/products/producer. Printed Sep. 14, 2005.

Windows Media Encoder 9 (from Microsoft): http://www.microsoft.com/windows/windowsmedia/9series/encoder/default.aspx. Printed Sep. 14, 2005.

ClearStory System's ActiveMedia 6.0 Digital Asset Management: http://www.clearstorysystems.com/products-services/activemedia.html. Printed Sep. 14, 2005.

thePlatform Media Publishing System: www.theplatform.com. Printed Sep. 14, 2005.

Jun Xin et al., "Digital Video Transcoding", Proceedings of the IEEE, vol. 93, No. 1, pp. 84-97, Jan. 2005.

Antani et al., "Robust Extraction of Text In Video", Proceedings of the International Conference on Pattern Recognition (ICPR'00), IEEE, 2000.

ASF Specification, Revision Jan. 20, 2003, Microsoft Corporation, Dec. 2004.

PCT International Search Report, PCT/US06/40190, Sep. 12, 2008, 5 pages.

* cited by examiner

REGIONS OF INTEREST IN VIDEO FRAMES

BACKGROUND

This description relates to regions of interest in video frames.

The display capabilities (screen size, density of pixels, and color depth, for example) of devices (ranging from big-screen televisions to flip phones) used to present video vary widely. The variation can affect the viewer's ability to read, for example, a ticker of stock prices or sports scores at the bottom of a news video, which may be legible on a television but blurred or too small to read on a cell phone or personal digital assistant (PDA).

Figure 1A:
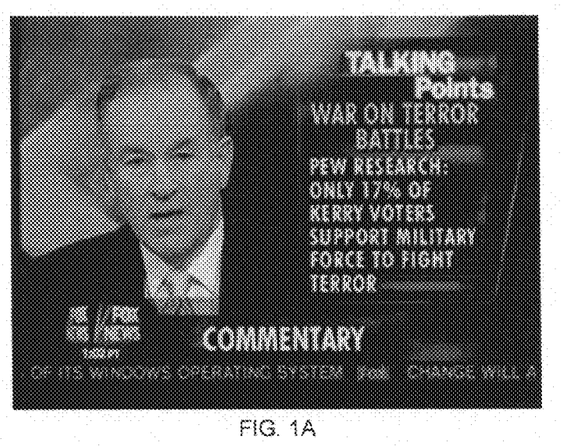
FIGS. 1A, 1B, 2A, 2B, 3A, 3B, 4A, 4B, 6, 9A, 9B, 9C, 9D, 10A, and 10B show screen shots.
Figure 1B:
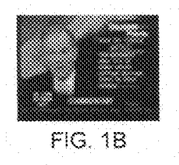

As shown in FIG. 1A, video content for television feeds is produced in formats, such as NTSC, PAL, and HD, that are suitable for television displays 102 (in the figure, the frame is shown in its native resolution) that are, for example, larger than 15 inches. As shown in FIG. 1B, by contrast, a display screen 104 of a handheld device, for example, is often smaller (on the order of 1.5 inches to 3 inches) and has a lower pixel resolution which makes the video frame, especially the text, less legible.

Figure 2A:
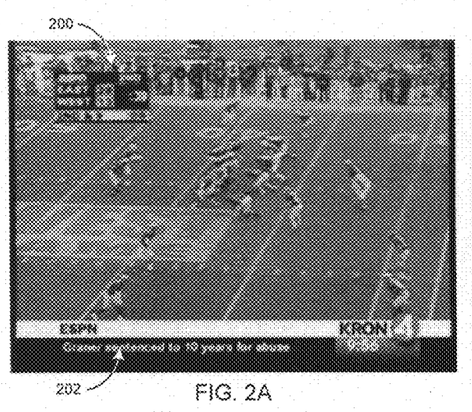
Figure 2B:
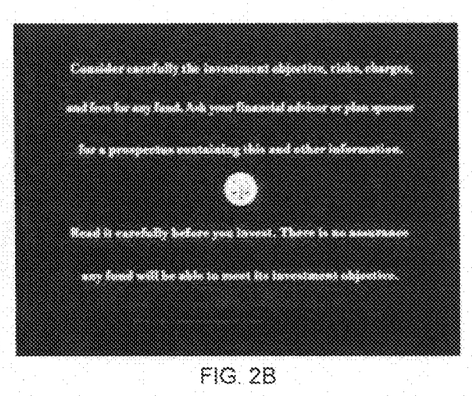

As shown in FIGS. 2A and 2B, certain kinds of content is especially illegible on small screens, such as information that is supplemental to the main video content, e.g.: sports statistics that may be inserted, for example: in a floating rectangle 200 that is superimposed or alpha-blended over a video feed of a sports game; fine print 204, e.g., movie credits or a disclaimer at the end of a commercial (as shown in FIG. 2B); a ticker 202 of characters that moves across the screen to display, for example, news or stock prices; or phone number or URL to contact for more information, for example, in a commercial (not shown).

Figure 2C:
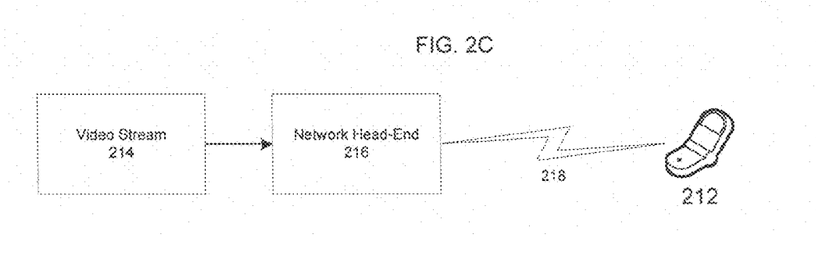
FIGS. 2C, 7A and 8A show block diagrams.

As shown in FIG. 2C, in the case of broadcasting digital video to handheld devices 212, the frames of the video are encoded and packaged in a video stream 214 by hardware and/or software at a network head-end 216 and delivered over a limited-bandwidth broadcast channel 218 to a population of the handheld devices (such as cell phones, PDAs, wrist watches, portable game consoles, or portable media players).

Handheld and other devices (and the limited-bandwidth channel) impose limitations on the ability of a viewer to perceive content in the video frames as it was originally intended to be perceived.

Figure 3A:
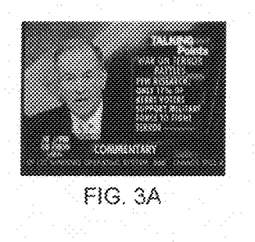

The small size of the handheld display makes it hard to discern details in the frame simply because it is hard for the eye (particularly of an older or visually impaired person) to resolve detail in small areas. This limitation arises from the smallness of the area being viewed, regardless of the resolution of the display, and would exist even for a high (or even infinite resolution) display, as illustrated in FIG. 3A, which shows a frame on a small, high resolution display 302.

Figure 3B:
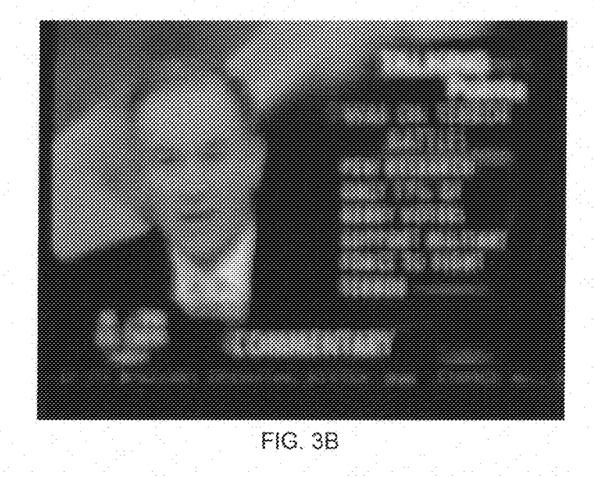

In addition, detail in a frame becomes blurry when the original pixel data of the frame is re-sampled at a lower pixel density for use on the lower resolution display. As a result of re-sampling, the viewer simply cannot see detail as well on, e.g., a stock ticker that is displayed at a quarter of the resolution of the original frame (half of the resolution in each dimension) as is typical for video broadcast to mobile devices using emerging mobile broadcast technologies like DVB-H and FLO. The blurriness would exist even if the handheld's display were large, as an enlarged low-resolution image 310 still lacks detail, as illustrated in FIG. 3B.

Solutions have been proposed for the limitations of small screens (a term that we sometimes use interchangeably with "displays").

Figure 4A:
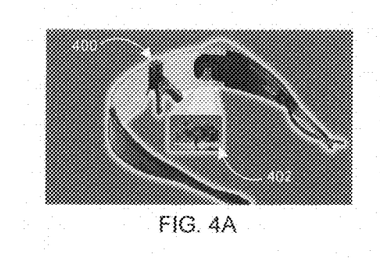

Supplemental (externally-connected) displays, holographic displays, and eye-mounted displays give the effect of a large-screen, high-resolution display in a small, portable package. For example, as shown in FIG. 4A, a virtual display 402, visible to a wearer of glasses 400, appears to be a full-sized display due to its proximity to the wearer's eye (not shown). Broadcasters that have a limited-capacity network (e.g. 6 Mb/s total capacity is a common capacity) avoid devoting a large amount of bandwidth to provide high-resolution video for relatively few viewers who own a high-resolution-capable display device. Instead of providing 3 or 4 high-resolution channels, broadcasters prefer to broadcast 20 or 30 lower-resolution channels. A high-resolution display is unable to provide high-resolution for the viewer if the frames that are received are of low resolution, and effectively becomes a low-resolution display.

Figure 4B:
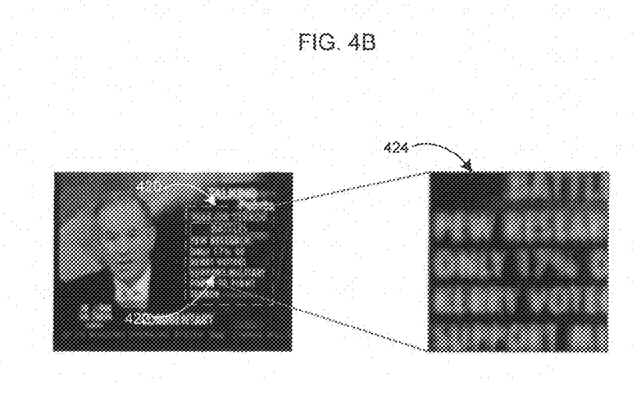

As shown in FIG. 4B, on a handheld that has pan-and-zoom capability, a user may zoom in on a part 422 of a region of interest 420 to produce an enlarged image 424. If region 420, once enlarged, is larger than a viewable area of the display, the user can pan to view the entire region. Because each frame carries no hidden or embedded latent information, expanding a region 420 of a low-resolution image produces a blurry image (e.g. image 424).

SUMMARY

In general, in one aspect, a first representation of a video stream is received that includes video frames, the representation expressing the video frames at a relatively high pixel resolution. At least one of the video frames is detected to include a region of interest. A second representation of the video stream that expresses the video frames at a relatively low pixel resolution is provided to a video playing device. Included with the second representation is additional information that represents at least a portion of the region of interest at a resolution level that is higher than the relatively low pixel resolution.

Implementations of the invention may include one or more of the following features. The region of interest contains text. The region of interest is expressed by the additional information at the same relatively high pixel resolution as the first representation. The additional information includes information about characteristics of the region of interest relative to the video frames. The characteristics include location in the frame. The characteristics include size of the region of interest. The characteristics include duration of appearance of the region of interest. The video playing device comprises a cellular telephone, PDA, a wristwatch, a portable video game console, or a portable media player. The additional information is provided to the video playing device as part of the video stream.

In general, in one aspect, a video stream to be provided to a video playing device is supplemented with (a) a stored image and (b) information that describes a location of the image within a frame of the video stream and enables a display of the stored image to be synchronized with the frame.

In general, in one aspect, a computer-readable medium contains data representing a video stream, the data including representations of a portion of a frame of the video stream at two different resolutions.

Implementations of the invention may include one or more of the following features. One of the representations of a portion of the frame is as part of a representation of the entire frame at a lower resolution, and another of the representations of a portion of the frame is of less than the entire frame and is at a higher resolution.

In general, in one aspect, a received video stream includes frames and additional data that includes (a) images of one or more regions of interest in the frames and (b) information that synchronizes the images with the frames. The video stream is displayed. Based on the synchronization information, an indication is provided to a viewer that the images of the one or more regions of interest exist.

Implementations of the invention may include one or more of the following features. The indication to the viewer comprises a graphical element displayed with the frames. The indication is provided in the vicinity of the one or more regions of interest. The viewer can select one or more of the regions for display in a higher resolution.

In general, in one aspect, a video stream is displayed to a viewer, the viewer is alerted that an additional image of a portion of at least one of the frames of the stream exists, and, in response to a request of the viewer, the image is displayed.

Implementations of the invention may include one or more of the following features. The image comprises a higher resolution version of a portion of at least one of the frames. The image is displayed as an overlay on the frame. The image is displayed in place of the frame. The image is displayed at the same time as but not overlaid on the frame. The image is displayed side by side or above and below with respect to the frames. The image is displayed continuously in synchronism with the frames of which it is a portion.

In general, in one aspect, a video stream comprising frames is displayed at a first resolution. In response to a viewer request, a portion of a frame of the video stream is displayed as an image at a second, different resolution.

In general, in one aspect, a cell phone or other handheld device receives a video stream of frames. At least one image of a region of interest contains (a) text and is part of at least some of the frames of the stream and (b) information about the location of the region of interest in the frame and the timing of the frames of which the region of interest is a part. The image has a higher resolution than the frames. While the video stream is being displayed, the region of interest is highlighted within the frames to which the region of interest belongs. In response to an action by the viewer, the image is displayed at the higher resolution.

Implementations are characterized by one or more of the following advantages. Viewers of handheld devices can easily view text areas, for example, with adequate resolution to read phone numbers, hyperlinks, scores, stock prices, and other similar information normally embedded in a television image.

Other general aspects may include other methods, apparatus, systems, and program products, and other combinations of the aspects and features mentioned above as well as other aspects and features.

Other advantages, aspects, and features will become apparent from the following description, and from the claims.

DESCRIPTION

The patent or application file contains at least one drawing executed in color. Copies of this patent or patent application publication with color drawing(s) will be provided by the Office upon request and payment of the necessary fee.

Figure 5:
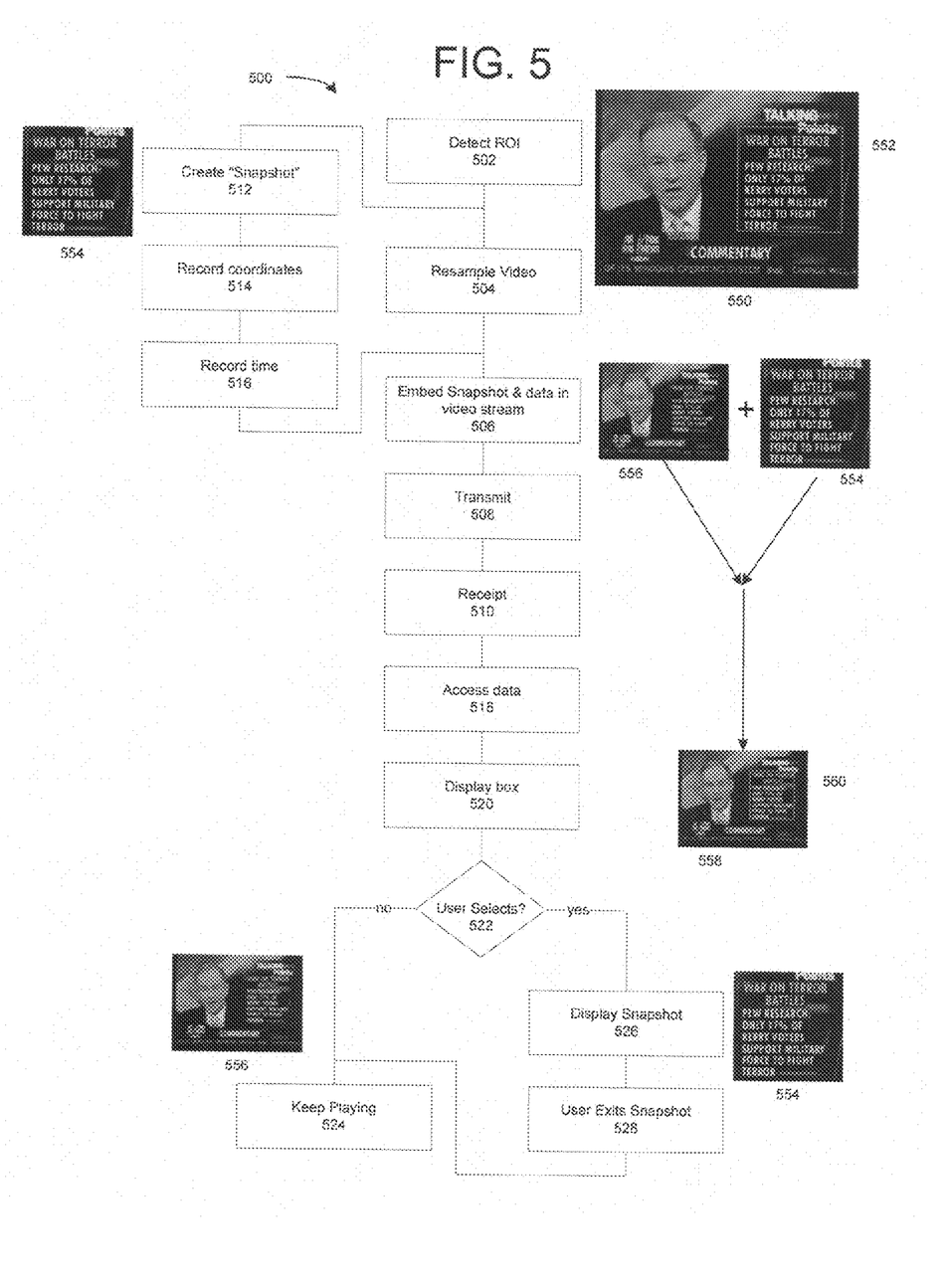
FIGS. 5, 7B, and 8B show flow charts.

As shown in FIG. 5, by embedding a high-resolution copy 554 of a region of interest 552 in a low-resolution video stream, the viewer can be provided with an ability to view the region of interest in the video at a useful resolution.

In some implementations of a process 500 for generating the high-resolution copy, an original high-resolution video stream 550 a region of interest 552 is detected 502 in each successive frame of the video stream. The detection step may be done in real time, frame by frame, as the video stream 550 is received for transmission at the head end, or the detection may be executed offline in a batch. The detection step may be adapted to detect multiple regions of interest, for example, the regions of interest 108, 110, 112, and 114 in FIG. 1A.

Process 500 next creates (512) a snapshot 554 of the region of interest 552. By a snapshot we mean a still image of a high resolution, for example, the same resolution as the original frame of the video stream. The location and size of region 552 and the period during which the region appears in frames of the video stream are stored (514, 516). The location and size may be expressed, for example, in terms of two or more corners of the region of interest or paths of two or more sides of the region, or a center of the region and its size. The period may be expressed, for example, in terms of the starting time and ending time, the starting time and duration, the starting and ending frame numbers, or other schemes.

If multiple regions of interest are detected, the process may create multiple snapshots and store multiple sets of location and size and period information. Separately from the detecting process, the original video stream 550 is re-sampled (504) (for example, in the usual way) into a low-resolution stream of frames 556. By re-sampling we mean reducing the resolution of each frame in the video stream or any other technique of reducing the amount of data that must be communicated to display the video stream whether or not frame by frame.

The snapshot 554 and the location/size and period information (which, including the snapshot, we now sometimes call the ROI data) previously stored (514, 516) are embedded (506) into the low-resolution video stream 556. The embedding 506 can occur before or after the re-sampling 504, provided that the embedding leaves the snapshot 554 at a higher resolution (e.g., the original resolution) than the resolution of the re-sampled frames.

The embedding of the ROI data may be done in a variety of ways. In some implementations, the video stream may be expressed in accordance with Microsoft's Advanced Streaming Format (ASF), a file format designed to store synchronized multimedia data (the specification of which is available at http://www.microsoft.com/windows/windowsmedia/format/asfspec.aspx). This format allows arbitrary objects to be embedded at specific times in a multimedia stream—for example, a JPEG image. Applications designed to interpret and play back ASF files (e.g., Windows Media Player®) will recognize these embedded objects and act upon them or, if an object is not recognized, pass it to an external module for processing. In this case, an ASF file may be injected with a JPEG by interleaving data packets containing these images within the ASF File Data Object.

For example, if the video stream 556 is encoded using the ASF file format, the embedding process 506 generates a script command, e.g., "image:location={50,50,100,100}, duration=HH:MM:SS, image.bmp." The embedding process 506 interleaves this script command and the image.bmp file corresponding to snapshot 554 into the audio data packet stream of the video stream 556.

The video stream 556 (which we sometimes now call the enhanced video stream) is then transmitted (508) to, and received (510) by, a playback device, not shown. By running an appropriate program as part of the playback process, the playback device, while displaying the frames of the video stream 556, can access (518) the embedded ROI data and use it to supplement the frames of the video image by displaying with the video image 558 a box 560 identifying a region of interest 552, as defined by the ROI data. In the example above, as the playback device begins accessing the data (518) of the ASF-formatted video stream 556, it displays the normal frames of the video stream. When the playback device encounters the script command interleaved in the audio data packet stream, it begins receiving the image.bmp file. Once the image.bmp file is fully received, the playback device displays the box 560 at the coordinates indicated by the "location" parameter in the script command. The box 560 is displayed for the duration specified in the "duration" parameter.

Multiple regions of interest could be identified by multiple boxes. The indication of the region of interest could be done using a wide variety of other visual cues. For example, the region of interest could be displayed with a slightly brighter set of pixels, or a grayed set of pixels.

In some cases, each of the frames may have its own associated ROI data. In some implementations, the ROI data need only be embedded when the ROI appears or disappears or when its size or location changes or when the content within the ROI changes.

The presence of a region of interest 552 in the video frame could be indicated to the viewer in other ways, for example, by a beep or other audible indicator or by an LED or other visual indicator that is separate from video frame 558.

If a viewer wishes to view a region of interest in greater detail, he uses a user interface device. If more than one ROI is available in the embedded ROI data, the user is given the option to select the desired ROI. The user interface device could be a touch screen or a device that controls a cursor or a speech recognizer, or any of a wide variety of other interface devices. The selection of an ROI from among multiple ROIs could be done by toggle through successive ROIs until a desired one is reached.

When the viewer has selected the ROI, the device and then displays the embedded snapshot 554 associated with that ROI, for example, in place of the video stream 556 on the display. In some implementations, the snapshot would not entirely replace the display of the video stream, but could fill a larger (e.g., much larger) portion of the screen than it fills in the original frames. In some implementations, a second screen could be provided on the device to display the snapshots while the main video stream continues to be displayed on the first screen, When the user has finished viewing the snapshot 554, he can indicate that through the user interface (or the device can determine that automatically by the passage of time), and the device resumes playing the low-resolution video stream 556 on the display. While the user is viewing one of the ROIs, he can be given the option to toggle to another ROI without first returning to the main video stream.

Note that a receiving device need not be capable of recognizing or using the ROI data and may then display the low-resolution video stream in the usual way without taking advantage of the ROI data.

Figure 6:
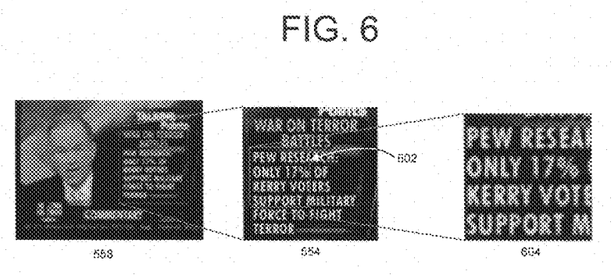

As shown in FIG. 6, if, after the user has selected and is viewing a ROI, he is still unable to see the details of he ROI or for some other reason wishes to see greater detail, he may invoke the user interface of the display device to zoom and pan the snapshot 554 and view any selected portion of it 602 in greater detail. Because the snapshot 554 is in high resolution, the enlarged image 604 will show the needed detail for the viewer.

Figure 7A:
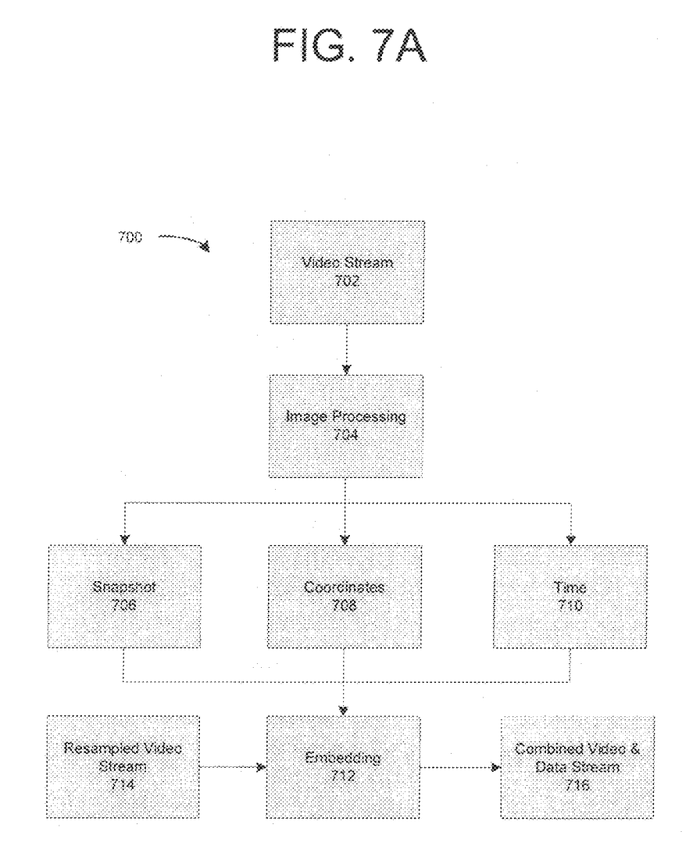
Figure 7B:
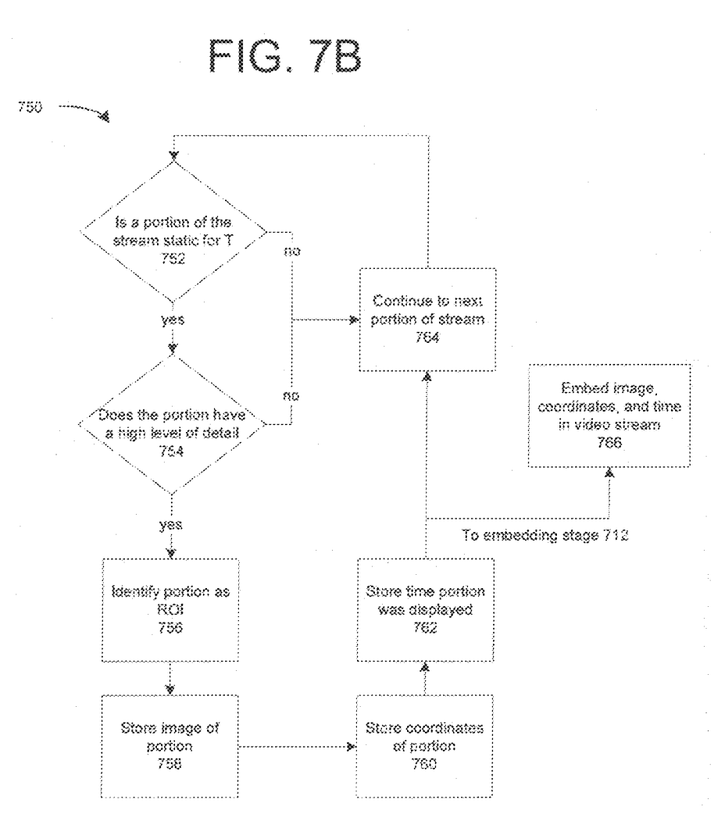

Some ways to identify the regions of interest in the video stream at the head end may use the process shown in FIGS. 7A and 7B. A video processing system 700, uses a process 750 to identify regions of interest. In FIG. 7A, a video stream 702 inters an image processing stage 704, which identifies whether there is a region of interest in the video stream. If there is, the image processing stage 704 outputs a snapshot 706 of the region of interest together with data describing the location and size 708 of the region of interest and data describing the period 710 when the region of interest is present in the video stream. The three outputs of the image processing stage 704 are embedded into the re-sampled video stream 714 at the embedding stage 712 to produce combined video & data stream 716 (which combines the original video stream with the ROI information including snapshots).

As shown in FIG. 7B as the video stream is supplied, the process 750 determines (752) whether a portion of the image component of the video stream remains static for a threshold period of time. In one example of how this is done, in the field of digital video compression, a region is determined to be a static one where the MPEG motion-compensation vectors and prediction error are below some threshold, indicating that a portion of the image component is relatively unchanged in successive frames. This is an indication that the determined portion of the image is not changing and therefore may be a region of interest. If the first condition is met, the process examines the portion of the image that has remained static to determine (754) whether it has a higher level of detail than moving parts of the image. A higher level of detail may indicate that the static portion of the image contains text, rather than other images that are not regions of particular interest.

Known techniques for detecting the presence of text in a video frame may also be used, including a complete video text-extraction system described in Antani et al., "Reliable Extraction of Text from Video," Proceedings of the International Conference on Pattern Recognition, 2000. This system works in a bottom-up manner: first it locates individual letters and words, and then aggregates these into super-regions. Locating text within video has also been discussed in T. Sato, T. Kanade, E. Hughes, and M. Smith, "Video OCR for Digital News Archives", IEEE, Workshop on Content-Based Access of Image and Video Databases (CAIVD'98), Bombay, India, pp. 52-60, January, 1998, using a combination of heuristics to detect text. These include looking for high-contrast regions and sharp edges. In general, better-performing techniques typically integrate results over a sequence of frames and apply multiple predicates (detectors) to the image.

Once a region of interest has been identified (756), the process stores an image of the region of interest as a still image in its native resolution. The process next records (760) the coordinates of the region of interest, e.g., (x,y) coordinates of the corners of the box bounding the region, or (x,y) coordinates of one corner and (dx,dy) dimensions for the box starting from that corner. The process next records (762) the period during which the region of interest was displayed in the video stream, e.g., the start time and end time, or the start and duration. This image and information is then provided to the embedding stage 712 (FIG. 7A) to be embedded (766) into the video stream, while the image processing process continues on to the next portion of the video stream.

Figure 8A:
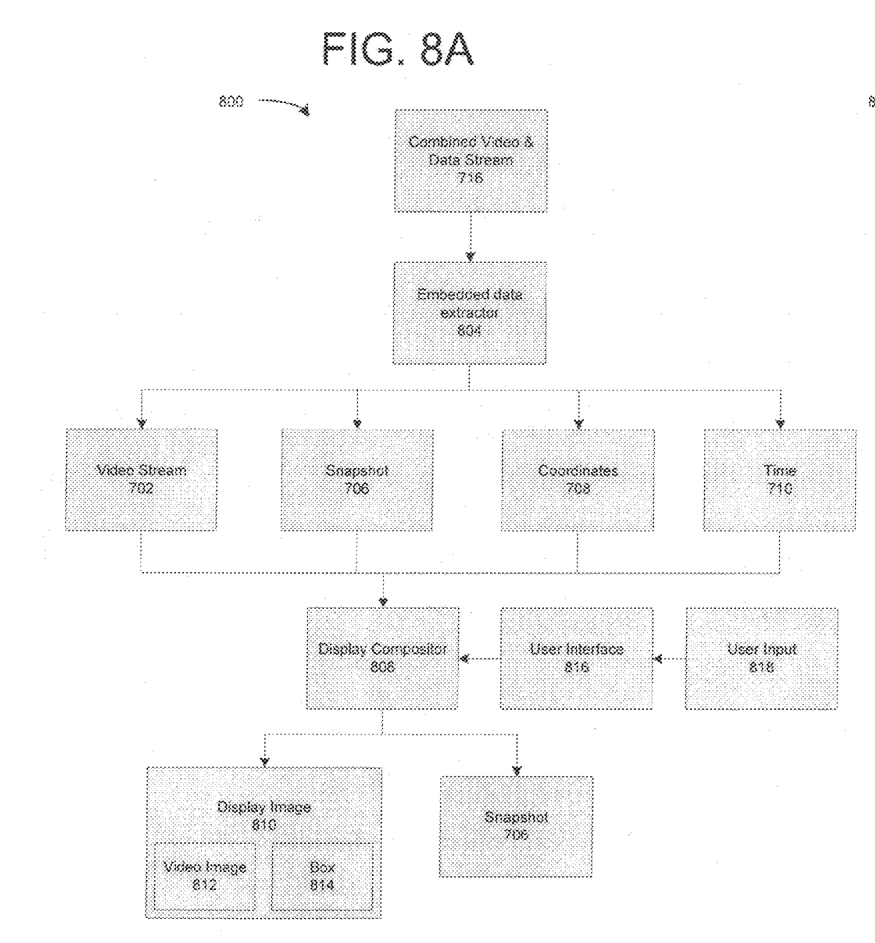
Figure 8B:
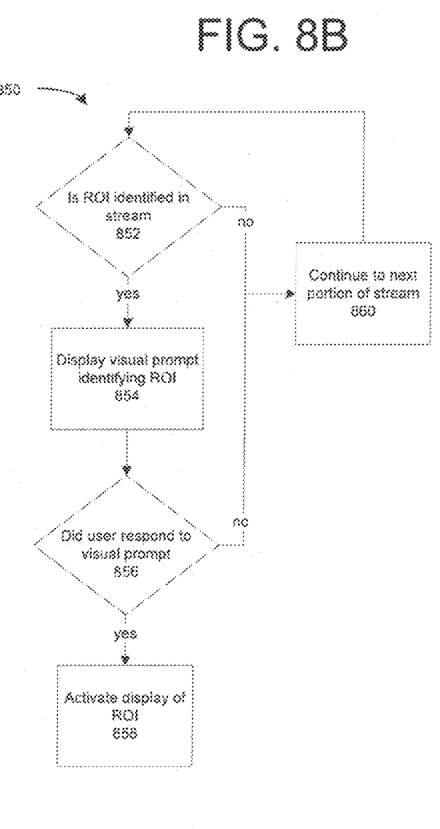

As shown in FIGS. 8A and 8B a display device's video processing system 800 and a process 850 are used to detect and display regions of interest embedded in a video stream. In FIG. 8A, the combined video and data stream 716 from FIG. 7A is received as input to the embedded data extractor 804. The extractor 804 detects that the region of interest data is present and extracts it from the combined data stream, outputting the original video stream 702, the snapshots 706 of region of interests, and the additional ROI information including location and size data 708, and period data 710. A display compositor 808 receives all of the output from the extractor 804 and uses it to create composite display image 810 by overlaying a box 814 over video image 812 at the location defined by coordinate data 708. The combined image is displayed during the period defined by period data 710. As the video stream plays, the display image 812 is updated by the current frames of video stream 702 while box 814 remains in place for the period indicated by period data 710. If the user interface 816 indicates that the user has provided an appropriate input 818, the display compositor 808 displays the snapshot 706 instead of the composite display image 810.

In the process 850 used by video processing system 800 the process determines (852) whether a region of interest is present in the combined video and data stream supplied to it. If there is region of interest data, a visual prompt (e.g., box 814 in FIG. 8A) is displayed (854) to indicate to the user that region of interest data is available. In the example of FIG. 8A, this is done by the display compositor 808. If the user responds to this prompt (856), the process activates (858) the display of the region of interest by replacing the video image with the snapshot of the region of interest embedded in the stream. If the user does not respond to the prompt (856), then the process continues (860) playing the video stream and continues monitoring (852) it for additional region of interest data.

In some implementations, the file is encoded using the ASF format, as discussed above. In this case, the media player that detects the embedded object will generate an event. This event will drive the player to act on this event asynchronously from the video stream. The event could be a linked module that highlights the region of interest within the video, perhaps with a colored outline or performs a variety of other steps depending on the data included in the ROI information Interaction with the user (816, 818, 856) can be accomplished in various ways, some illustrated in FIGS. 9A through 9D.

Figure 9A:
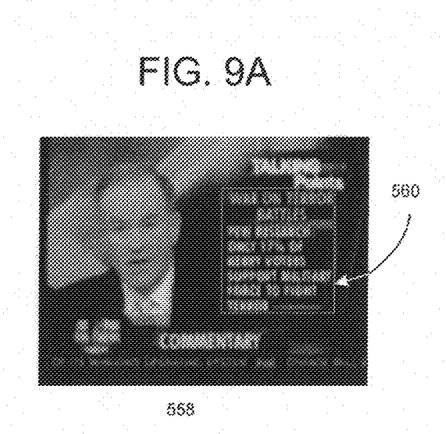
Figure 9B:
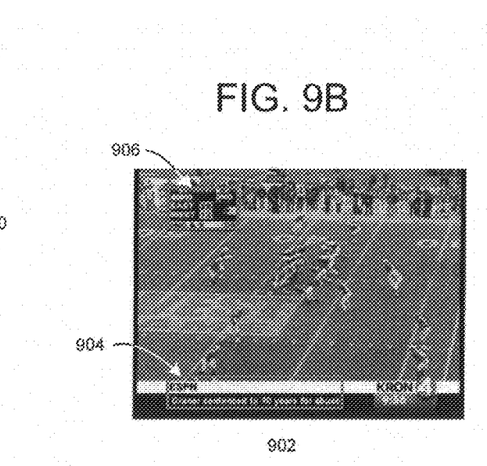
Figure 9C:
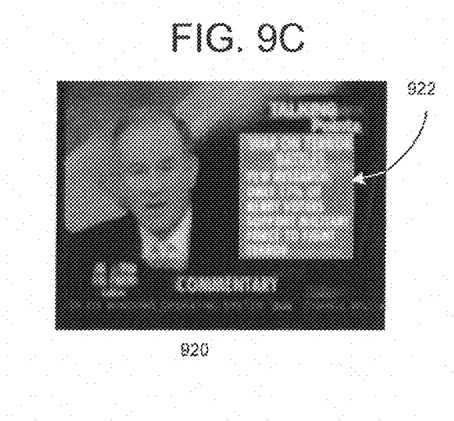
Figure 9D:
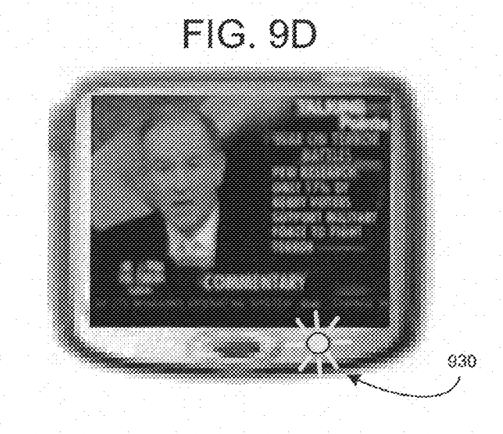

In FIG. 9A, as in the examples above, in a frame 558 a box 560 is displayed around a region of interest 561 when it is on screen as part of the video stream. If two regions of interest are present, as in the frame 902 in FIG. 9B, multiple boxes 904, 906 are displayed. In other examples, other visual cues, such as changing the brightness of the area defining the region of interest, e.g., region 922 of image 920 in FIG. 9C, or flashing a light external to the display could be used, e.g. 930 in FIG. 9D. In response to whatever indication is used, the user could indicate his wish to view the snapshot of the region of interest in a variety of ways. If the display device is equipped with a touch-sensitive screen or with some other means of pointing to and selecting items on the screen, the user could make his choice by touching or otherwise selecting the region of interest he wishes to view while it is displayed. In another example, a button external to the video image, either in hardware or in another graphical part of a user interface, could be pressed. If more than one region of interest is displayed, one input might be used to select which region of interest is desired, while a second input, or a different treatment of the same input (e.g., double-clicking a button), is used to initiate display of the snapshot of that region of interest. In the examples where more than one region of interest is available, an input may be used to change which region's snapshot is displayed without first returning to the video stream.

Figure 10A:
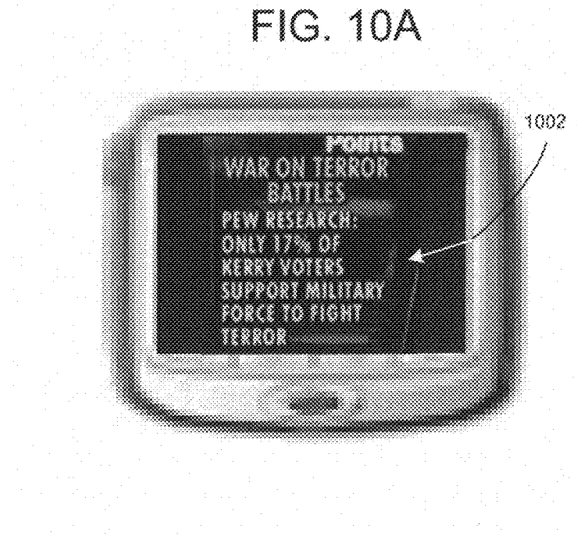
Figure 10B:
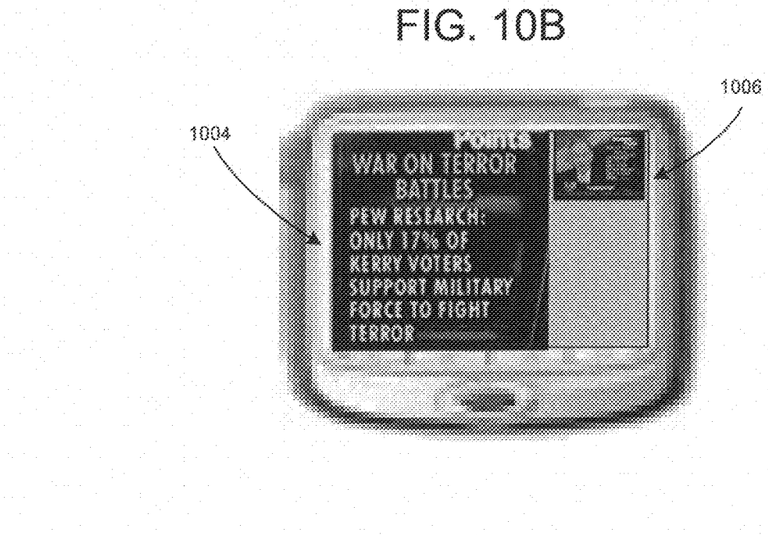

There are various ways in which the snapshot of the region of interest can be displayed, some of which are illustrated in FIGS. 10A and 10B. In FIG. 10A, the snapshot 1002 will expand to take up the entire screen and may be panned and zoomed in or out using cursor keys or other directional input. In FIG. 10B, the snapshot will appear in one frame 1004 (e.g., on the left of the screen) and a scaled-down image of the video stream will appear in another frame 1006 (e.g., on the right of the screen). This scaled down image may continue to run in frame 1006, or it may be a still image of the video as it appeared when the snapshot was selected. The snapshot in the left frame 1004 may be panned and zoomed. Some other input, such as touching the right frame if the display is touch-sensitive, restores the default view.

Other implementations are also within the scope of the following claims.

The region of interest could be other than text.

The invention claimed is:

1. A process comprising
 receiving a first representation of a video stream that includes video frames, the representation expressing the video frames at a high pixel resolution,
 automatically generating a second representation of the video stream that expresses the video frames at a pixel resolution lower than the high pixel resolution,
 detecting that at least one of the video frames includes a region of interest that is static for a period of time in the video stream,
 creating a still image of the static region of interest,
 broadcasting over a broadcast channel to a population of mobile video playing devices the second representation of the video stream that expresses the video frames at the pixel resolution lower than the high pixel resolution, and information, embedded in the video stream having the lower resolution, that represents the region of interest as the still image at a resolution level that is higher than the low pixel resolution.

2. The process of claim 1 in which the region of interest contains text.

3. The process of claim 1 in which the region of interest is expressed by the embedded information at the same high pixel resolution as the first representation.

4. The process of claim 1 in which the broadcasting over the broadcast channel to the population of mobile video playing devices includes information about characteristics of the region of interest relative to the video frames.

5. The process of claim 4 in which the characteristics include location in the frame.

6. The process of claim 4 in which the characteristics include size of the region of interest.

7. The process of claim 4 in which the characteristics include duration of appearance of the region of interest.

8. The process of claim 1 in which the video playing device comprises a cellular telephone.

9. The process of claim 1 in which the video playing device comprises a PDA.

10. The process of claim 1 in which the video playing device comprises a wristwatch.

11. The process of claim 1 in which the video playing device comprises a portable video game console.

12. The process of claim 1 in which the video playing device comprises a portable media player.

13. The process of claim 4 in which the information about characteristics is provided to the video playing device as part of the video stream.

* * * * *

UNITED STATES PATENT AND TRADEMARK OFFICE
CERTIFICATE OF CORRECTION

| | | |
|---|---|---|
| PATENT NO. | : 7,876,978 B2 | Page 1 of 1 |
| APPLICATION NO. | : 11/249897 | |
| DATED | : January 25, 2011 | |
| INVENTOR(S) | : Adam L. Berger et al. | |

It is certified that error appears in the above-identified patent and that said Letters Patent is hereby corrected as shown below:

On the title page item 73, delete "Penthera Technologies, Inc." and insert --Penthera Partners, Inc.--

Signed and Sealed this
Tenth Day of May, 2011

David J. Kappos
*Director of the United States Patent and Trademark Office*